(12) United States Patent
Brand

(10) Patent No.: US 10,296,595 B2
(45) Date of Patent: May 21, 2019

(54) MULTI-LEVEL NAMESPACE MANAGEMENT SYSTEM AND METHOD THEREOF FOR HYBRID CLOUD STORAGE SYSTEMS

(71) Applicant: CTERA Networks, Ltd., Petach Tikva (IL)

(72) Inventor: Aron Brand, Petach-Tikva (IL)

(73) Assignee: CTERA Networks, LTD., Petach-Tikva (IL)

( * ) Notice: Subject to any disclaimer, the term of this patent is extended or adjusted under 35 U.S.C. 154(b) by 484 days.

(21) Appl. No.: 14/709,902

(22) Filed: May 12, 2015

(65) Prior Publication Data

US 2015/0324381 A1    Nov. 12, 2015

Related U.S. Application Data

(60) Provisional application No. 61/991,850, filed on May 12, 2014.

(51) Int. Cl.
*G06F 17/30* (2006.01)
*G06F 21/62* (2013.01)

(52) U.S. Cl.
CPC .... *G06F 17/30115* (2013.01); *G06F 17/3023* (2013.01); *G06F 17/30088* (2013.01); *G06F 17/30123* (2013.01); *G06F 17/30221* (2013.01); *G06F 21/6218* (2013.01)

(58) Field of Classification Search
CPC .................................................. G06F 21/6218
See application file for complete search history.

(56) References Cited

U.S. PATENT DOCUMENTS

| | | | | |
|---|---|---|---|---|
| 7,603,357 B1* | 10/2009 | Gourdol | ............ | G06F 17/30171 |
| 8,010,498 B2* | 8/2011 | Gounares | ............ | G06F 11/2094 |
| | | | | 707/665 |
| 2003/0233544 A1* | 12/2003 | Erlingsson | .......... | G06F 21/6218 |
| | | | | 713/167 |
| 2004/0230599 A1* | 11/2004 | Moore | .................. | G06F 3/0481 |
| 2005/0044095 A1* | 2/2005 | Jameson | ................ | G06Q 10/00 |
| 2005/0050054 A1* | 3/2005 | Clark | ................. | G06F 17/30174 |
| 2005/0055380 A1* | 3/2005 | Thompson | ........ | G06F 17/30286 |
| 2006/0004703 A1* | 1/2006 | Spivack | .............. | G06F 17/3089 |

(Continued)

*Primary Examiner* — Robert W Beausoliel, Jr.
*Assistant Examiner* — Nirav K Khakhar
(74) *Attorney, Agent, or Firm* — M&B IP Analysts, LLC

(57) ABSTRACT

A multi-level namespace management system. The system comprises a processing unit; and a memory, the memory containing instructions that, when executed by the processing unit, configure the namespace management system to: maintain a plurality of multi-level namespaces for data stored by a storage system, wherein each of the plurality of multi-level namespaces designates at least one of: at least one personal folder of a user, at least one shared-folder being shared with the user by other users, and at least one project namespace designating at least one project folder that is accessible by the user; and maintain for each of the plurality of multi-level namespaces, an escalation policy enabling a potential escalation of the at least one personal folder to the at least one project namespace, thereby allowing the at least one personal folder to be viewed and accessed throughout a hierarchy of the at least one project namespace.

22 Claims, 8 Drawing Sheets

(56) References Cited

U.S. PATENT DOCUMENTS

2011/0026898 A1\* 2/2011 Lussier ............... G11B 27/034
                                                    386/280
2012/0173655 A1\* 7/2012 McEntee ............ H04L 67/1097
                                                    709/216

\* cited by examiner

MULTI-LEVEL NAMESPACE MANAGEMENT SYSTEM AND METHOD THEREOF FOR HYBRID CLOUD STORAGE SYSTEMS

CROSS-REFERENCE TO RELATED APPLICATIONS

This application claims the benefit of U.S. Provisional Application No. 61/991,850 filed on May 12, 2014, the contents of which are hereby incorporated by reference.

TECHNICAL FIELD

The present disclosure generally relates to cloud storage systems, and more particularly to management and structuring of namespaces in such systems.

BACKGROUND

The demand for data storage has been rapidly escalating because as the amount of data, such as digital media, stored by users grows, so does the users' need to store digital media reliably over extended periods of time. Storage systems to store digital media range from a local storage media (e.g., CDs and backup tapes) and network storage systems (such as NAS or file servers) to cloud-based storage systems.

Network storage systems such as NAS and file servers provide access to files to users connected in a local area network though standard file sharing protocols (e.g., common internet file system (CIFS) or network file system (NFS)).

Cloud-based storage systems, also referred to as cloud storage services (CSS), provide mass storage through a web service interface available through the Internet. The storage infrastructure includes a distributed array of geographically distributed data centers connected to a plurality of clients through a wide area network (WAN). A data center typically consists of servers and mass storage to facilitate cloud storage services to the clients. Such services enable applications including, for example, backup and restoration of data, data synchronization, file sharing, and so on.

A directory structure in a storage system controls how data is stored and retrieved. Without a directory structure, information placed in a storage area would be one large body of data with no way to locate files in an organized fashion. By separating the data into folders and giving each folder a name, the information is easily separated and identified. The structure and logic rules used to manage the groups of information and the names of such groups is referred to as a "namespace". As an example, a path in a namespace may be, e.g., \\server\my documents\share1.

In traditional file sharing systems, such as NAS devices or file servers, a single namespace, in which the files of all users are stored, exists per server in the form of folders, each folder having a specific access control list. An exemplary namespace 100 of a NAS is shown in FIG. 1.

The drive 'c' 110 includes root folders "users" 121, "projects" 122, and "marketing projects" 123. Each such root folder has its own sub-folders (collectivity labeled as sub-folders 130), and some sub-folders may further include additional sub-folders (collectivity labeled as nested sub-folders 140). For example, the sub-folder 'user1' has two nested sub-folders, 'my documents' and 'my pictures.' As an example, the corresponding namespace where 'user1' is "Mark Barkely" may be as follows:

```
C:\Users\mark-barkely\my documents
C:\Users\mark-barkely\my pictures
```

The disadvantage of the namespace utilized in NAS and the like is that they scale poorly to organizations with thousands of users because all such users are exposed to the same namespace. Further, in large file systems having tens of thousands of folders with differing access rights, the directory hierarchy must become deep, complex, and often difficult to manage.

One approach to simplifying conventional namespaces is to expose users to a "global namespace" or "unified namespace." Such namespaces provide the ability to aggregate disparate and remote network based file systems, thereby providing a virtualized, consolidated view, as if the files were stored on a single file server. However, such namespace systems suffer from the same scalability and ease-of-use limitations as namespaces adopted by traditional file sharing systems.

Additionally, as the fixed hierarchy of folders shared by all users results in deeply nested hierarchies of folders, users in small to large organizations cannot share information in a convenient way.

Some cloud-based storage systems forego the concept of a fixed, shared folder hierarchy and instead expose each user to a private namespace. This approach allows the namespace owner to conveniently view all their folders and files as well as folders and files shared with the namespace owner. However, personal or shared folders irrelevant to the namespace owner are not visible. Such cloud-based systems also allow users to invite each other to interact and share folders without the need for IT assistance. This approach is more agile and scalable, and suitable for self-organizing teams and ad-hoc collaboration.

An example for a private namespace 200 utilized by the cloud-based storage systems is illustrated in FIG. 2. The root folders 210 of a user are 'my documents,' 'my pictures,' and 'shared with me.' The root folders 210 can be shared with other users such as, e.g., 'user1' and 'user2'. When a folder is shared with another user, that folder appears as a folder in the target user's namespace. The advantage of this model is that each user views a relatively simple and small directory structure, regardless of the overall size and number of users in the system.

The namespace utilized to the following methods are used to ensure that the shared folders do not conflict with each other may be as follows:

```
/shared with me/<user name>/shared folder name/
/shared with me by user name/shared folder name/
/shared folder name (user name)/
```

That is, in the example shown in FIG. 2, the folders reports, gateways, and agents of user2 are shared with the user having the private namespace 200.

The private namespace is particularly disadvantageous in large organizations or networks, because organizational projects are often not owned by a specific person, but by specific groups or a role, which consist of a set of users that change over time. Furthermore, private namespace lacks a clear separation between folders shared personally between a number of individuals, and group projects, which are not strictly "owned" by a single fixed user but are rather owned by a specific role or group in the organization, and viewed by many individuals or in some cases even the entire organization.

It would be therefore advantageous to provide a namespace that overcomes the deficiencies of conventional systems in order to provide at least efficient data collaboration.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later. For convenience, the term some embodiments may be used herein to refer to a single embodiment or multiple embodiments of the disclosure.

Certain exemplary embodiments include a multi-level namespace management system. The system comprises a processing unit; and a memory, the memory containing instructions that, when executed by the processing unit, configure the namespace management system to: maintain a plurality of multi-level namespaces for data stored by a storage system, wherein each of the plurality of multi-level namespaces designates at least one of: at least one personal folder of a user, at least one shared-folder being shared with the user by other users, and at least one project namespace designating at least one project folder that is accessible by the user; and maintain for each of the plurality of multi-level namespaces, an escalation policy enabling a potential escalation of the at least one personal folder to the at least one project namespace, thereby allowing the at least one personal folder to be viewed and accessed throughout a hierarchy of the at least one project namespace.

Certain exemplary embodiments include a method of managing multi-level namespaces in a storage system. The method comprises maintaining a plurality of multi-level namespaces for data stored by the storage system, wherein each of the plurality of multi-level namespaces designates at least one of: at least one personal folder of a user, at least one shared-folder being shared with the user by other users, and at least one project namespace designating at least one project folder that is accessible by the user; and maintaining for each of the plurality of multi-level namespaces, an escalation policy enabling a potential escalation of the at least one personal folder to the at least one project namespace, thereby allowing the at least one personal folder to be viewed and accessed throughout a hierarchy of the at least one project namespace.

BRIEF DESCRIPTION OF THE DRAWINGS

The subject matter disclosed herein is particularly pointed out and distinctly claimed in the claims at the conclusion of the specification. The foregoing and other features and advantages of the disclosed embodiments will be apparent from the following detailed description taken in conjunction with the accompanying drawings.

DETAILED DESCRIPTION

Figure 1:
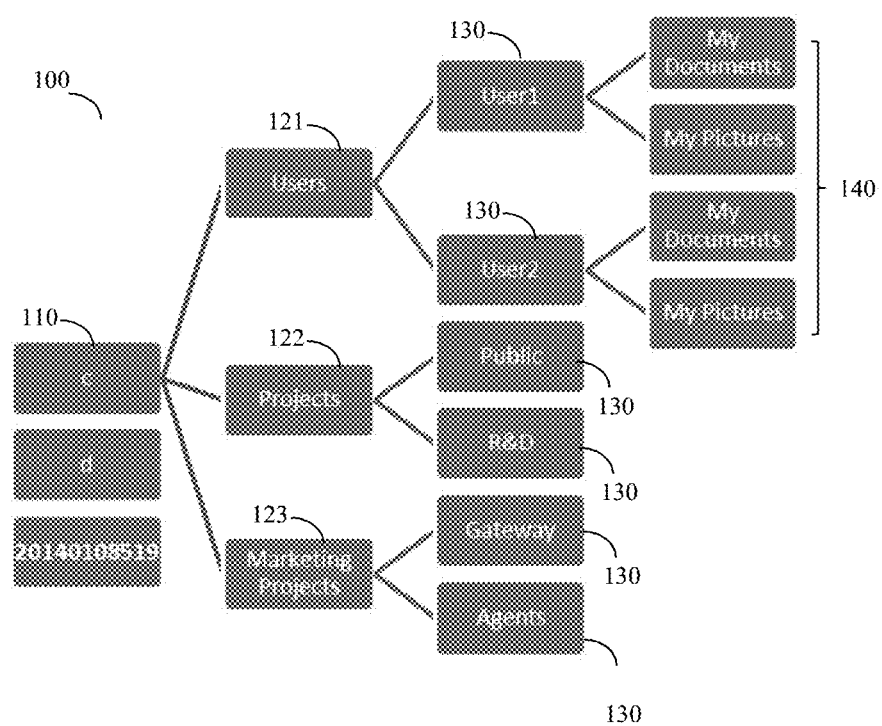
FIG. 1 is a schematic diagram illustrating a namespace of a conventional file system.
Figure 2:
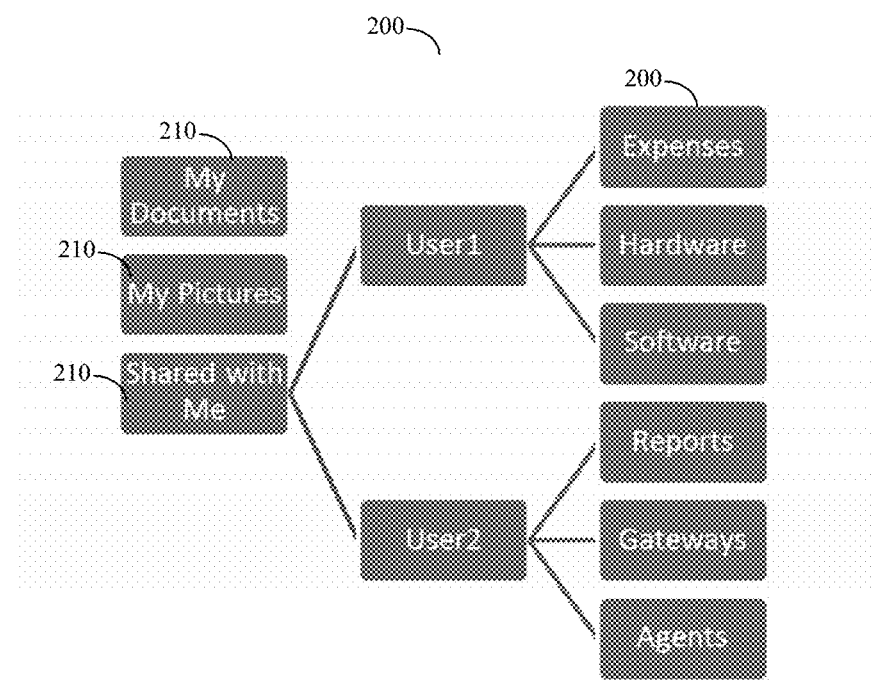
FIG. 2 is a schematic diagram illustrating a private namespace used in cloud-based storage system.

It is important to note that the embodiments disclosed herein are only examples of the many advantageous uses of the innovative teachings herein. In general, statements made in the specification of the present disclosure do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

According to the disclosed embodiments, a method for organizing data in cloud-based storage systems that would allow efficient collaboration between users and providing a namespace thereof is provided. The disclosed namespace is a multi-level namespace that exposes a project namespace for each user. The multi-level namespace includes at least the user's personal folders, folders shared by other users that are accessible by this user, and at least one project namespace containing project folders that are accessible by this user. In an embodiment, users can escalate personal folders to a specific project namespace under a predefined policy. In some embodiments there may be multiple levels of nested project namespaces.

That is, the proposed multi-level namespace is a personal namespace that can include 3 entities: 1) personal folders; 2) "shared with me" folders; 3) one or more project namespaces. The multi-level namespace can be utilized in a cloud-based storage system and/or a cloud-enabled storage system, as discussed in detail below.

According to an embodiment, users can share their personal folders with any other user with restrictions, where some restrictions can be defined by a policy, for ad-hoc sharing. The policy can define users or groups of users that the personal folders cannot be shared with. The policy may further define a temporal duration of sharing such as, for example, permanent allowance, or an allowance restricted to a specific time period after which the recipient's access is automatically revoked.

As will be discussed below, the user may be able to escalate personal folders to a project namespace. The escalation of a personal folder to a project namespace allows the personal folder to be viewed and accessed throughout the hierarchy of the project namespace. In an embodiment, a policy is defined, e.g., by a system administrator, controlling which users or groups of users are allowed to escalate personal folders to each project namespace. As another example, a specific set of users and groups of users may be configured with "project management" permissions for each specific namespace, as shown in the exemplary FIG. 6.

Figure 6:
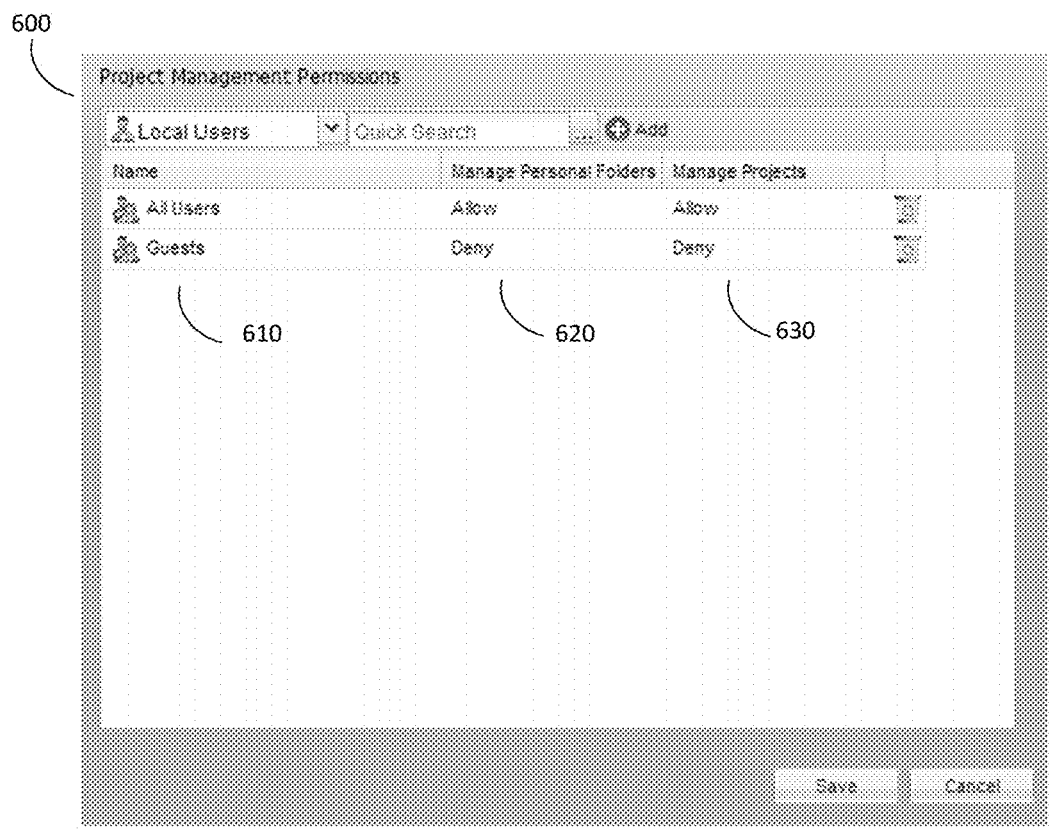
FIG. 6 is an exemplary screenshot for configuring project management permissions.

FIG. 6 is an exemplary screenshot 600 for configuring project management permissions. An administrator may configure a specific set of users and groups of users with "project management" permissions for each specific namespace. In an embodiment, an administrator may select the user or group of users 610, access to personal folders 620, and access to project folders 630.

The project namespace is a proprietary entity which allows multiple users to access folders designated in the project namespace. In an embodiment, project namespaces are structured in a hierarchy, such as in a traditional file-system namespace (for example, the namespace 100). Therefore, the proposed file-system allows users structural access to folders organized as in a file server. It should be appreciated that the project namespace may further include additional entities which allow scalability beyond the limitations of the traditional file-system namespaces.

Figure 3:
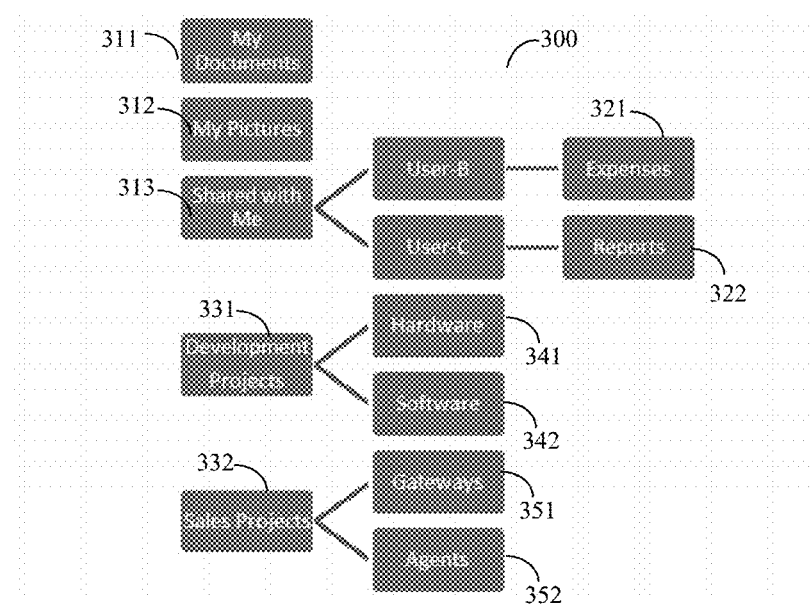
FIG. 3 is a schematic diagram illustrating a multi-level namespace according to an embodiment.

FIG. 3 shows a schematic diagram of a multi-level namespace 300 structured according to one embodiment. The multi-level namespace 300 is of a sample user "user-A". The personal folders of user-A are "my documents" 311 and "my pictures" 312. The "shared with me" entity 313 includes folders shared with user-A by other users. In the exemplary multi-level namespace 300, user-B and user-C share their expenses folder 321 and reports folder 322, respectively.

In the exemplary namespace 300, two project namespaces, "development projects" 331 and "sales projects" 332, are defined. The project namespace "development projects" 331 further includes the folders "hardware" 341 and "software" 342, while the project namespace "sales projects" 332 further includes the folders "gateways" 351 and "agents" 352.

It should be noted that project namespaces 331 and 322 include only one level in the hierarchy merely for sake of illustration and without limiting the scope of the embodiment. A typical hierarchy of the project namespace would include multiple folders and sub-folders linked thereto. It should be further noted that the name "project" selected for such namespace is merely an exemplary name. Other names for namespaces may be selected and utilized without departing from the scope of the embodiment. Any name associated with the namespace entity is a reserved name, i.e., cannot be used as a folder name of a personal folder or of a "shared with me" folder.

Generalizing the exemplary multi-level namespace 300, a sample user (user-A) views the personal namespace as follows:

/myfolder1
/myfolder2
...
/myfolder2
/shared with me/<source user name>/sharedfolder
/projects/project1
/projects/project2
...
/projects/project2

As noted above, the "share with me" folders can be listed together directly under "shared with me". However, as folders' names must be unique, a unique identifier can be added to the folder name, for example, by adding a suffix with the source user name as follows: /shared with me/share-folder (source user name)

The "projects" may be assigned with different project names and folders of the respective projects. It should be noted that users in the organization may be granted access and can create or modify files in the project namespace's folders and/or "shared with me" folders based on their granted access rights.

In an exemplary embodiment, an administrator would be able to access the personal folders of all users. This is achieved, for example, by exposing to privileged users another reserved namespace in the following format: /users/<user>/<the personal folders of user>.

Figure 4:
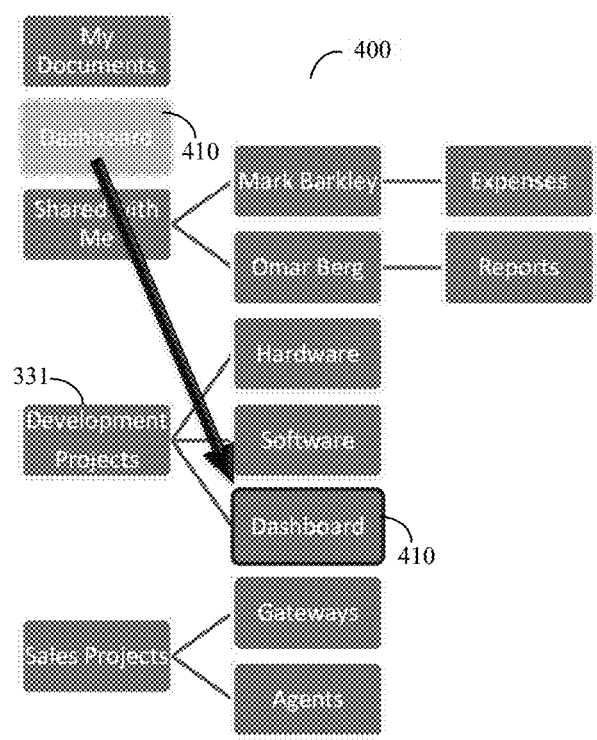
FIG. 4 is a schematic diagram illustrating a project namespace according to an embodiment.

As noted above, according to one embodiment, a personal folder can be escalated to a project namespace. As illustrated in FIG. 4, the personal folder "dashboard" 410 is escalated to the project namespace "development projects" 331, and is added as a folder in its hierarchy.

The embodiments disclosed herein are performed using a multi-level namespace management system (NMS). The NMS maintains the underlying directory data structures as defined the multi-level namespace 300 of all users having access to the storage system. The storage system in which the disclosed NMS can be implemented may include, but is not limited to, a cloud storage system and/or a hybrid cloud storage system.

The cloud storage system typically utilizes online file sharing and storage services. Users store and share their folders in the cloud. In this embodiment, the NMS may be connected in the cloud. Alternatively or collectively, the NMS can be integrated in any client connecting to the cloud, such as a PC, a mobile device, and the like.

The hybrid cloud storage system provides cloud storage services to cloud-enabled devices connected in the LAN. An example for a hybrid cloud storage system is described in co-pending patent application Ser. No. 12/641,559, assigned to common assignee, the contents of which are herein incorporated by reference. The embodiments applicable to the hybrid cloud storage system are further described herein below with reference to FIG. 5.

A user such as, e.g., a system administrator, can configure and/or manipulate the namespaces residing in the NMS through a console. Therefore, the policies defining the access and/or escalation settings can also be defined through the console and stored in the NMS. The policy may be defined per namespace, per folder, per user, or per group of users.

In both types of cloud storage systems, the NMS also allows transparently accessing the user's collaboration namespace by mounting the namespace, or portions of thereof, as a local folder or drive on a client device accessing the cloud storage, for example, by mounting the namespace as a network drive using the WebDAV protocol, while authenticating to the cloud storage system with the user's credentials. The client device may be, but is not limited to, a PC, a mobile device, a file server, a NAS appliance, and the like.

In another embodiment, the NMS is configured to resolve any naming conflicts (i.e., overlapping naming of folders) arising during an escalation process of a personal folder to a folder in the project namespace. Such conflicts arise on the initial project name or specific escalated folder when a folder with a reserved name is selected for escalation. Such conflicts may be resolved by automatically assigning new, unique folder names to the shared project. Alternatively or collectively, the user is prompted for a name change that will affect shared view or both shared view and local storage.

In yet another embodiment, the NMS is configured to support automatic erasure of any local copy or cache of a shared folder to which the user access rights have been revoked.

In an embodiment, the NMS is configured to expose previous snapshots of each folder designated in the multi-level namespace for versioning purposes. This enables displaying one or more prior and/or current versions of existing or formerly existing folders as part of the multi-level namespace. A non-limiting example for a snapshot versioning namespace may include:

/myfolder1/previous versions/<snapshot date>/
/myfolder2/previous versions/<snapshot date>

Figure 5:
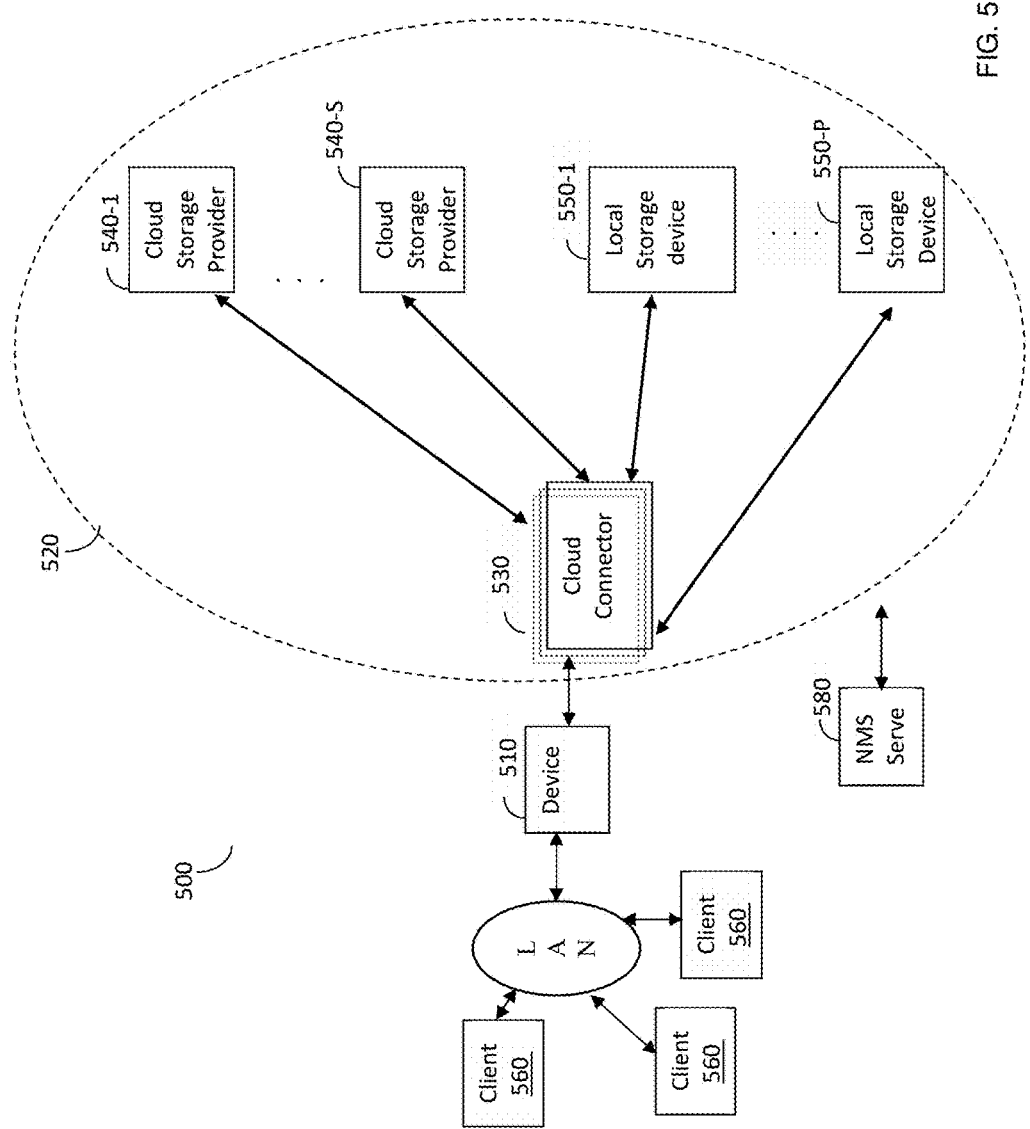
FIG. 5 is a diagram of a hybrid cloud storage system in which files can be collaborated and accessed by the disclosed multi-level namespace.

FIG. 5 shows an exemplary hybrid cloud storage system 500 utilizing a multi-level namespace according to one embodiment. In the system 500, a cloud-enabled device 510 is connected to a CSS 520. The CSS 520 includes a plurality of cloud connectors 530 that facilitate connections between a cloud-enabled storage device 510 and local storage devices 550-1 through 550-P (e.g., disk drives and/or SAN/NAS devices), local object storage systems, such as EMC Atmos, or OpenStack, and public cloud storage providers 540-1 through 540-S (e.g., Amazon® Web Services, IBM Smart-Cloud®, etc.).

The cloud connectors 530 operate in parallel to enable load balancing and to avoid a single point of failure. The cloud-enabled storage device 510 provides cloud storage services to clients 560 connected in a LAN. The cloud-enabled storage device 510 and each of the cloud connectors 530 implement a cloud transport protocol (CTP) to synchronize file contents between the cloud-enabled storage device 510 and the CSS 520. The cloud-enabled device 510, cloud connectors 530, and the CTP are further described in a co-pending patent application Ser. No. 12/641,559 referenced above.

According to the disclosed embodiments, the NMS may be integrated or implemented in the cloud-enabled storage device 510, in one or more clients 560, in one or more cloud connectors 530, and/or in a dedicated NMS server 580. In any deployment, the NMS is configured to perform the embodiments disclosed herein.

In the cloud system 500, files in the cloud-enabled storage device 510 are typically backed-up in the CSS 520. According to one embodiment, the backups can also be exposed in the multi-level namespace, for example, as read only folders with snapshot identifiers as shown above. Backup folders can be shared with other users and synchronized as regular folders. For example, the backup of cloud attached devices owned by the user can be exposed in the personal namespace as follows:

Most recent backups: /backups/devicename/
Previous backups: /backups/devicename/previous versions/<snapshot date>/

Administrators can view the backup of specific users through their respective multi-level namespace. For example, an administrator may be able to access a particular user's backup by exposing the following format in the personal namespace: /users/user name/backups/devicename/

In some embodiments, a user can access the cloud enabled device 510 remotely or locally. Once the user is authenticated, the cloud-enabled storage device 510 exposes the multi-level namespace associated with the user. As noted above, such namespace typically includes at least the user's personal folders, folders shared by other users that are accessible by this user, and at least one project namespace, containing project folders that are accessible by this user. In an embodiment, the device 510 can enforce the access permissions to the files in the personal folders on behalf of the CSS 520.

In another embodiment, the CSS 520 is further configured to manage all the folders internally in a flat namespace which is user-neutral. In the flat namespace, folders of files saved in the CSS 520 ("cloud folders") are indexed by a unique folder ID. For each cloud folder, the CSS 520 is also configured to store an associated access control list (ACL), a folder name, and a folder namespace ID. The folder namespace ID is for personal folders the personal namespace ID of a specific user, and for project folders the project namespace ID in which the folder is stored.

For each user, the CSS 520 is configured to translate a user-neutral flat namespace into a user-specific multi-level namespace. In a non-limiting embodiment, the namespace translation is performed by the CSS 520 as shown in FIG. 7.

Figure 7:
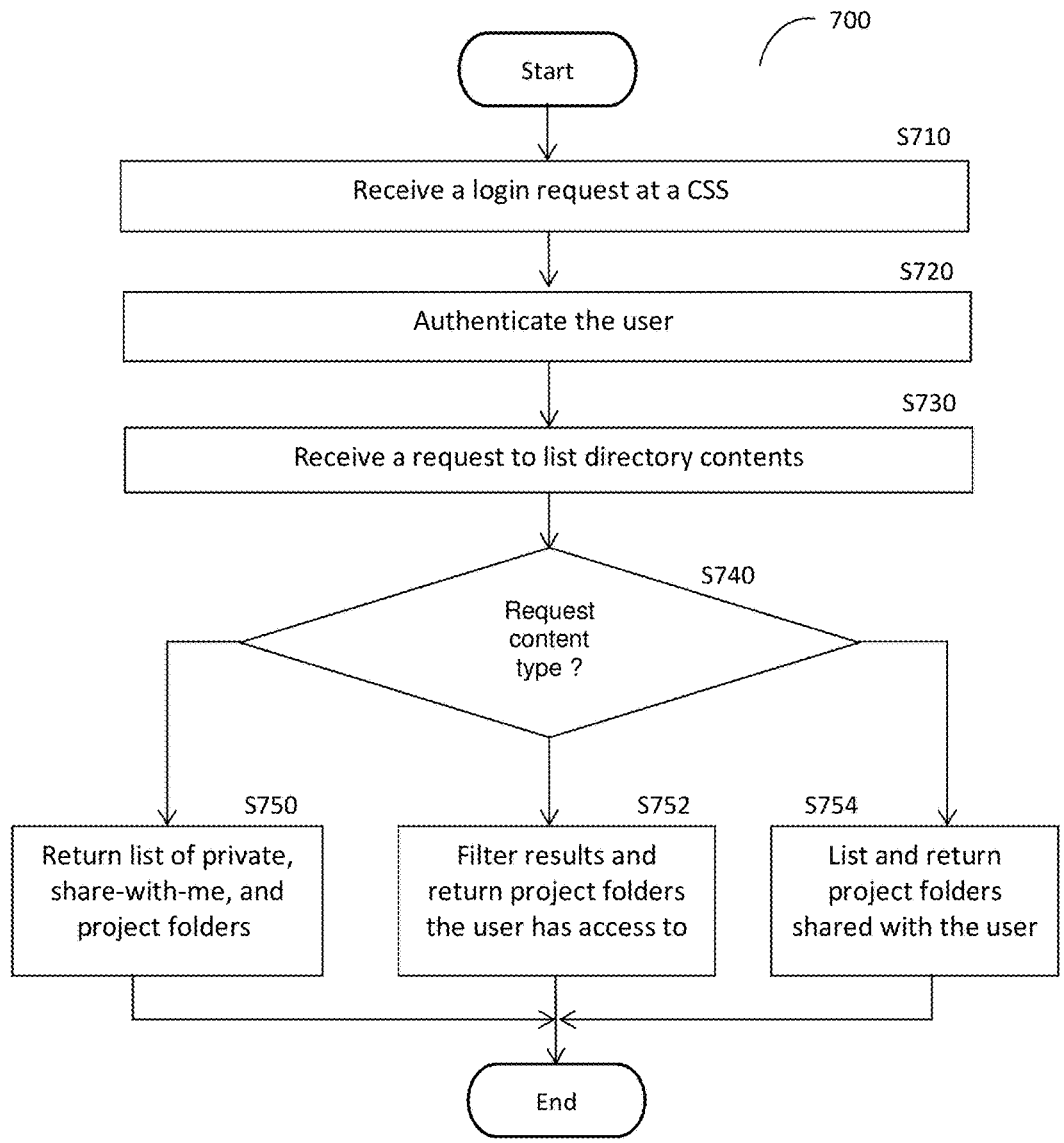
FIG. 7 is a flowchart showing a namespace translation process performed by the CSS according to one embodiment.

FIG. 7 is a flowchart 700 showing a namespace translation process performed by a CSS according to one embodiment. At S710, a user login request is received from a client associated with a user. Then, at S720, the user is authenticated. Following the authentication, at S730, a request from the client to list directory contents is received.

At S740, the request is analyzed to check the type of the requested directory contents. If the request is to list the contents of the top-level folder (root), at S750, a customized list of folders designated in the multi-level namespace is returned. Such folders include personal folders in the user's personal namespace, the "shared with me" folders, and folders from the project namespace to which the user has access permissions. The CSS 520 is configured to reply with this list.

Otherwise, i.e., if the request is to list the contents of a project namespace, at S752, the results are filtered according to the access rights of the user and returned to the user. If the check, at S740, determines that the request is for a "shared with me" folder, then at S754, personal folders shared with this user from other namespaces are listed and returned to the user.

Referring back to FIG. 5, in certain deployments, "cloud storage gateways" or "cloud-integrated network storage devices" enable local access to files in a CSS 520 over traditional file system protocols such as CIFS or NFS. The cloud-integrated network storage devices or gateways may be hardware or software appliances. In an embodiment, the multi-level namespace management system and the multi-level namespace disclosed herein and described above is implemented by cloud-integrated network storage devices or gateways.

A cloud-enabled storage device 510 is connected to the CSS 520 with a privileged account that allows access to the flat namespace. The cloud-enabled storage device 510 and the CSS 520 share a user directory (for example LDAP or Active Directory). The cloud-enabled storage device 510 is configured to synchronize and/or provide cached access all or a subset of cloud folders stored in the CSS 520, and to enforce the associated access control lists. The CSS 520 exposes to the cloud-enabled storage device 510 the underlying flat namespace, and the cloud-enabled storage device 510 is then configured to translate the flat namespace into the multi-level namespace visible to the end users.

Figure 8:
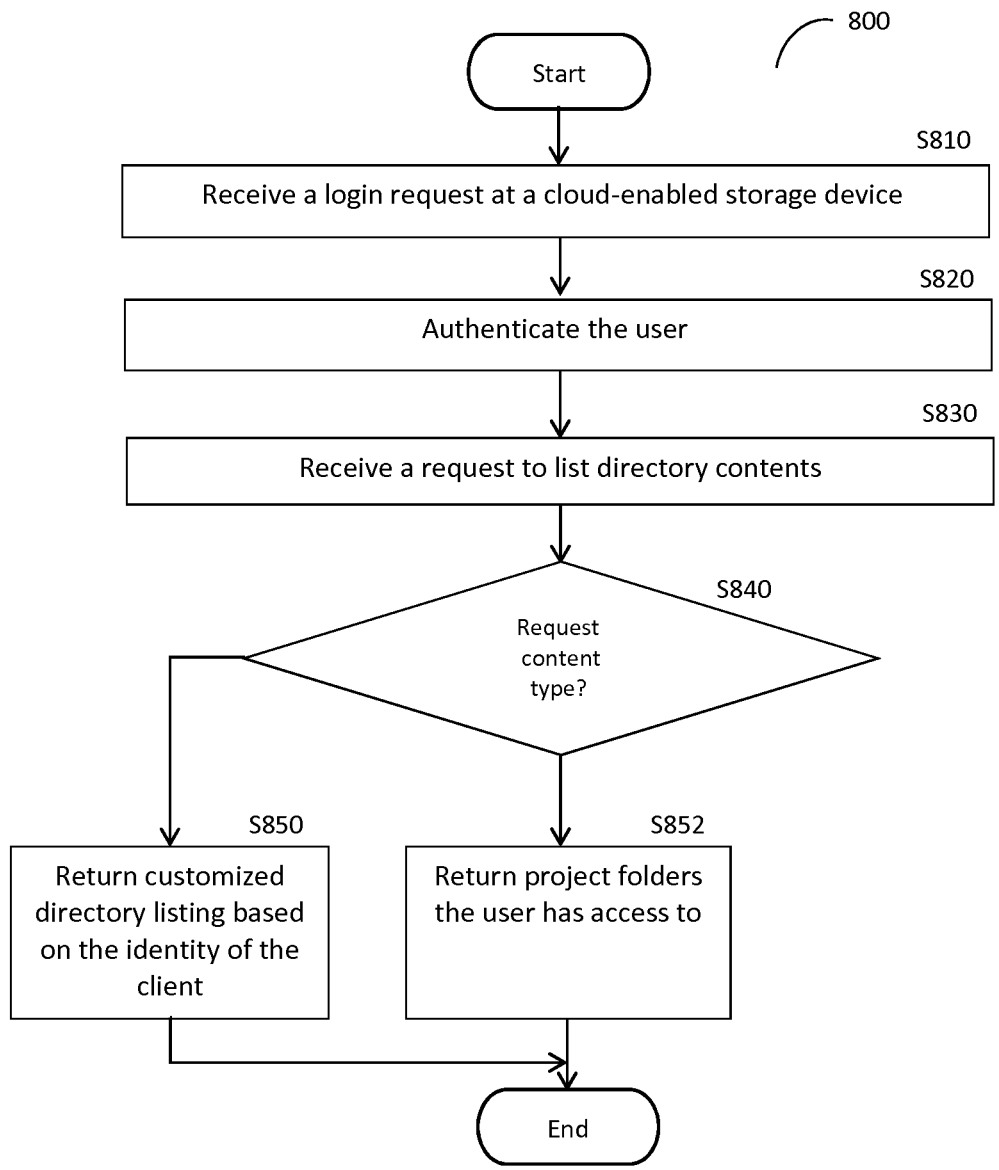
FIG. 8 is a flowchart showing a namespace translation process performed by a cloud-enable storage device according to one embodiment.

An exemplary and non-limiting flowchart for translating a flat namespace into a multi-level namespace as performed by the cloud-enabled storage device 510 is provided in FIG. 8. At S810, a logon request for a user from a client 560 is received at the cloud-enabled storage device 510. The request is received using a file sharing protocol (such as CIFS). At S820, the user is authenticated. Following the authentication, at S830, a request from the client to list directory contents is received.

At S840, the request is analyzed to check the type of the requested directory contents. If the request is to list the contents of the top level folder (root), then at S850, a customized directory listing based on the identity of the client is returned. This includes, for example, the personal folders of the as well as the reserved folder "Share with me" and the project namespaces "Development projects" and "Sales projects" as illustrated in the namespace of 300. The cloud-enabled storage device 510 is configured to return the customized directory.

When requested to list the contents of a project namespace, then at S852, the contents of this project namespace are filtered based on the folders in the project namespace which this user has permission to view. Such folders are return to the user. The cloud-enabled storage device 510 is configured to filter the contents and return the folders. In an embodiment, when the user requests to read/write a specific file, the cloud-enabled storage device 510 is enforced permissions on behalf of the CSS 520, based on the ACL of the file and their parent folders. In another embodiment, the cloud-enabled storage device 510 also locally enforces storage quotas for each folder on behalf of the CSS 520.

When files or folders are updated, the identity of the user which performed the operation is sent to the CSS 520 along with the operation for logging and auditing purposes.

In a preferred embodiment, the ACLs and list folders are cached locally on the cloud-enabled storage device 510 to improve listing performance and to provide a local-speed access to folder contents as well as offline access to locally cached folders and files while correctly enforcing access permissions.

In another embodiment, a multi-level namespace is provided to a client device (e.g., a PC, smartphone, tablet computer, etc.) of a user by means of an agent service installed on the computer. In this embodiment, the agent is configured to access the CSS using the flat namespace, and then provides to the user of the client device a virtual cloud drive. The virtual cloud drive contains the multi-level namespace applicable to the user (implemented, for example, using Filesystem in Userspace—FUSE). The agent is configured to enforce access permissions to the virtual cloud drive based on the access control rules received from the CSS.

It should be appreciated that the embodiments disclosed herein can provide efficient collaboration of files among different users belonging to an organization through the project namespace and users outside of an organization through a "shared with me" folder. Implementing the namespace management embodiments disclosed herein in a cloud storage system would allow collaboration of files saved locally in user devices and storage devices residing in the cloud.

The embodiments disclosed herein may be implemented as hardware, firmware, software, or any combination thereof. Moreover, the software is preferably implemented as an application program tangibly embodied on a program storage unit or tangible computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The memory may be a volatile memory, non-volatile memory or any combination thereof. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. All or some of the servers may be combined into one or more integrated servers. Furthermore, a non-transitory computer readable medium is any computer readable medium except for a transitory propagating signal. The display segments and mini-display segments may be shown on a display area that can be a browser or another other appropriate application, either generic or tailored for the purposes described in detail hereinabove.

All examples and conditional language recited herein are intended for pedagogical purposes to aid the reader in understanding the principles of the disclosed embodiments and the concepts contributed by the inventor to furthering the art, and are to be construed as being without limitation to such specifically recited examples and conditions. Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A multi-level namespace management system, a namespace being an organizational structure and logic rules used to manage a folder structure and names thereof, comprising:

a processing unit; and a memory, the memory containing instructions that, when executed by the processing unit, configure the namespace management system to:

create a plurality of multi-level namespaces for data stored by a storage system, wherein each respective one of the plurality of multi-level namespaces is a personal multi-level namespace for a respective user, and each respective user's personal multi-level namespace exposes at least one of each of: at least one personal folder of the respective user, at least one shared-folder being shared with the respective user by other users, and at least one project namespace designating at least one project folder that is accessible by the respective user; and escalate, in response to user input and when such escalation is in compliance with an escalation policy, the at least one personal folder to the at least one project namespace so that the escalated at least one personal folder is made accessible to users other than the respective user from whom the personal folder was escalated throughout a hierarchy of the at least one project namespace in accordance with permissions of the project and wherein the escalation policy contains rules controlling permission of the users to escalate personal folders to each project namespace.

2. The namespace management system of claim 1, wherein the at least one project namespace is a hierarchy of a plurality of multiple folders and sub-folders linked thereto.

3. The namespace management system of claim 1, wherein the at least one project namespace allows multiple users to access folders and sub-folders designated in the project namespace.

4. The namespace management system of claim 1, further configured to:
resolve any naming conflicts resulted from escalating the at least one personal folder to the at least one project namespace.

5. The namespace management system of claim 1, wherein the multi-level namespace may be viewed in a snapshot, the snapshot comprising a snapshot versioning namespace including at least one of: prior versions and current versions of existing or formerly existing folders.

6. The namespace management system of claim 1, wherein the escalation policy is defined per namespace, per folder, per user, or per group of users.

7. The namespace management system of claim 1, wherein the storage system includes at least one of: a cloud storage system and a hybrid cloud storage system.

8. The namespace management system of claim 7, wherein the namespace management system is integrated in at least one of: a cloud-enabled storage device of cloud storage of the hybrid cloud storage system, a client device, an agent installed in the client device, a cloud connector of the hybrid cloud storage system, and a dedicated server communicatively connected to the hybrid cloud storage system.

9. The namespace management system of claim 7, wherein the namespace management system is further configured to:
translate for each user a flat namespace into the multi-level namespace of the respective user.

10. The namespace management system of claim 9, wherein the namespace management system is further configured to:
receive a logon request from a client device associated with the user;
authenticate the user;
receive a request for a list of directory contents;
analyze the request to determine the type of the requested directory contents;
return a customized directory listing when the request is for a top level folder; and
return a list of folders designated in the project namespace, when the request is for the project namespace, wherein the list of folders includes only folders that the user has permission to access.

11. The namespace management system of claim 7, wherein the namespace management system is further configured to:
provide for each user a virtual cloud drive containing the multi-level namespace of the respective user.

12. A method of managing multi-level namespaces in a storage system, a namespace being an organizational structure and logic rules used to manage a folder structure and names thereof, comprising:
creating a plurality of multi-level namespaces for data stored by a storage system, wherein each respective one of the plurality of multi-level namespaces is a personal multi-level namespace for a respective user, and each respective user's personal multi-level namespace exposes at least one of each of: at least one personal folder of the respective user, at least one shared-folder being shared with the respective user by other users, and at least one project namespace designating at least one project folder that is accessible by the respective user; and
escalating, in response to user input and when such escalation is in compliance with an escalation policy, the at least one personal folder to the at least one project namespace so that the escalated at least one personal folder is made accessible to users other than the respective user from whom the personal folder was escalated throughout a hierarchy of the at least one project namespace in accordance with permissions of the project and wherein the escalation policy contains rules controlling permission of the users to escalate personal folders to each project namespace.

13. The method of claim 12, wherein the at least one project namespace is a hierarchy of a plurality of multiple folders and sub-folders linked thereto.

14. The method of claim 13, wherein the at least one project namespace allows multiple users to access folders and sub-folders designated in the project namespace.

15. The method of claim 12, further comprising:
resolving any naming conflicts resulted from escalating the at least one personal folder to the at least one project namespace.

16. The method of claim 12, wherein the multi-level namespace may be viewed in a snapshot, the snapshot comprising a snapshot versioning namespace including at least one of: prior versions and current versions of existing or formerly existing folders.

17. The method of claim 12, wherein the escalation policy is defined per namespace, per folder, per user, or per group of users.

18. The method of claim 12, wherein the storage system includes at least one of: a cloud storage system and a hybrid cloud storage system.

19. The method of claim 18, wherein the namespace management system is integrated in at least one of: a cloud-enabled storage device of cloud storage of the hybrid cloud storage system, a client device, an agent installed in the client device, a cloud connector of the hybrid cloud storage system, and a dedicated server communicatively connected to the hybrid cloud storage system.

20. The method of claim 19, further comprising translating a flat namespace into the multi-level namespace by:
receiving a logon request from a client device associated with the user;
authenticating the user;
receiving a request for a list of directory contents;
analyzing the request to determine the type of the requested directory contents;
returning a customized directory listing when the requested directory contents is a top level folder; and
returning a list of folders designated in the project namespace, when the requested directory contents is for the project namespace, wherein the list of folders includes only folders that the user has permission to access.

21. The method of claim 20, further comprising:
returning a list of personal folders shared with the user, when the request is for a folder shared with the user.

22. The method of claim 18, the method further comprising:
 providing a virtual cloud driver containing the multi-level namespace of the user.

\* \* \* \* \*